(12) United States Patent
Lee et al.

(10) Patent No.: US 10,708,279 B2
(45) Date of Patent: Jul. 7, 2020

(54) METHOD AND APPARATUS FOR TRANSMITTING DATA

(71) Applicant: ELECTRONICS AND TELECOMMUNICATIONS RESEARCH INSTITUTE, Daejeon (KR)

(72) Inventors: Jae Seung Lee, Daejeon (KR); Moon-Sik Lee, Daejeon (KR); Young-Hoon Kim, Daejeon (KR); Jaewoo Park, Daejeon (KR); Gyung-chul Shin, Daejeon (KR); Hoo Sung Lee, Sejong-si (KR); Ik Jae Chun, Daejeon (KR); Jeeyon Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 219 days.

(21) Appl. No.: 15/390,826

(22) Filed: Dec. 27, 2016

(65) Prior Publication Data

US 2017/0187724 A1 Jun. 29, 2017

(30) Foreign Application Priority Data

| Dec. 24, 2015 | (KR) | 10-2015-0186517 |
| Jan. 4, 2016 | (KR) | 10-2016-0000588 |
| Jan. 6, 2016 | (KR) | 10-2016-0001501 |
| Feb. 5, 2016 | (KR) | 10-2016-0014761 |
| Mar. 11, 2016 | (KR) | 10-2016-0029898 |
| Mar. 17, 2016 | (KR) | 10-2016-0031885 |
| Nov. 9, 2016 | (KR) | 10-2016-0149123 |
| Dec. 26, 2016 | (KR) | 10-2016-0178830 |

(51) Int. Cl.
*H04L 29/06* (2006.01)

(52) U.S. Cl.
CPC ........ *H04L 63/123* (2013.01); *H04L 63/0428* (2013.01); *H04L 63/08* (2013.01); *H04L 63/12* (2013.01)

(58) Field of Classification Search
CPC .... H04L 63/123; H04L 63/0428; H04L 63/08
See application file for complete search history.

(56) References Cited

U.S. PATENT DOCUMENTS

| 4,608,684 A | * | 8/1986 | Upp | H04Q 11/04 370/368 |
| 2003/0177391 A1 | * | 9/2003 | Ofek | H04L 47/10 726/4 |
| 2003/0185239 A1 | * | 10/2003 | Miller | H04L 1/0083 370/474 |

(Continued)

OTHER PUBLICATIONS

Dan Harkins et al., "Definition of the GCMP Ciphersuite", IEEE P802.11 Wireless LANs, Sep. 2010.

*Primary Examiner* — Tongoc Tran
(74) *Attorney, Agent, or Firm* — LRK Patent Law Firm

(57) ABSTRACT

A method and apparatus for transmitting data. Data to be transmitted is an aggregated frame including a first subframe and a second subframe each including information used to verify integrity of each subframe, and an apparatus receiving the data verifies integrity of a subframe based on the information used to verify the integrity.

11 Claims, 19 Drawing Sheets

(56) References Cited

U.S. PATENT DOCUMENTS

| | | | |
|---|---|---|---|
| 2005/0141498 A1* | 6/2005 | Cam Winget | H04L 63/08 370/389 |
| 2005/0157715 A1* | 7/2005 | Hiddink | H04L 1/0007 370/389 |
| 2006/0062188 A1* | 3/2006 | Nyberg | H04L 1/1642 370/338 |
| 2006/0288204 A1* | 12/2006 | Sood | H04L 63/083 713/161 |
| 2007/0195830 A1* | 8/2007 | Lorek | H04J 3/0685 370/503 |
| 2007/0291829 A1* | 12/2007 | Nabetani | H04L 1/0005 375/219 |
| 2008/0295144 A1* | 11/2008 | Cam-Winget | H04L 63/08 726/1 |
| 2009/0164788 A1 | 6/2009 | Cho et al. | |
| 2009/0327736 A1* | 12/2009 | Cam-Winget | H04L 63/061 713/181 |
| 2013/0031365 A1 | 1/2013 | Park et al. | |
| 2015/0282163 A1 | 10/2015 | Stanze et al. | |
| 2016/0219491 A1* | 7/2016 | Sakurai | H04B 7/155 |
| 2017/0310424 A1* | 10/2017 | Chun | H04L 1/16 |
| 2017/0325262 A1* | 11/2017 | Tomeba | H04W 74/08 |

* cited by examiner

METHOD AND APPARATUS FOR TRANSMITTING DATA

BACKGROUND OF THE INVENTION

1. Field of the Invention

The present disclosure relates to technology for transmitting data, and more particularly, to a method and apparatus for transmitting an aggregated frame including a plurality of subframes.

2. Description of Related Art

When exchanging data using wireless communication, the data may be exposed or manipulated by an external terminal that is not directly involved in the exchange. To prevent such an exposure of the data, a method of encrypting the data may be primarily used. Additionally, a method of verifying the data may be secondarily used to detect whether the data is manipulated. Thus, through a verification method that is perceived only by a data transmitter and a data receiver, whether data received by the data receiver is manipulated may be verified.

SUMMARY OF THE INVENTION

An aspect of the present disclosure provides a method and apparatus for transmitting data.

Another aspect of the present disclosure provides a method and apparatus for verifying integrity of received data.

According to an aspect of the present disclosure, there is provided a data transmission method to be performed by a transmitting terminal, the method including generating an aggregated frame including a frame header, a first subframe, and a second subframe, and transmitting the generated aggregated frame to a receiving terminal. The first subframe may include first integrity verification information, and the first integrity verification information may be used to verify integrity of the frame header and integrity of the first subframe.

In response to the first integrity verification information being verified by the receiving terminal, the integrity of the frame header and the integrity of the first subframe may be simultaneously determined.

The method may further include establishing association with the receiving terminal. The generating of the aggregated frame may be performed during the associated phase with the receiving terminal.

The establishing of the association may include generating a beacon frame, propagating the generated beacon frame, receiving a response to the beacon frame from the receiving terminal, and establishing the association with the receiving terminal based on the received response. In response to the association with the receiving terminal being established, a beacon frame may not be generated.

The first integrity verification information may be generated based on the frame header and a first subheader of the first subframe.

The generating of the aggregated frame may include generating the frame header to include a first secure frame counter (SFC) value of the first subframe. The first SFC value may be used to generate the first integrity verification information.

The first SFC value may be used by the receiving terminal to verify the first integrity verification information.

The generating of the aggregated frame may include generating the second subframe. The generating of the second subframe may include generating a second SFC value of the second subframe based on the first SFC value, generating second integrity verification information of the second subframe based on the generated second SFC value, and generating the second subframe to include the second integrity verification information and not to include the second SFC value in the aggregated frame.

A method of generating the second SFC value based on the first SFC value may be predetermined between the transmitting terminal and the receiving terminal.

According to another aspect of the present disclosure, there is provided a transmitting terminal configured to transmit data, the transmitting terminal including a processor configured to generate an aggregated frame including a frame header, a first subframe, and a second subframe, and a communicator configured to transmit the generated aggregated frame to a receiving terminal. The first subframe may include first integrity verification information, and the first integrity verification information may be used to verify integrity of the frame header and integrity of the first subframe.

According to still another aspect of the present disclosure, there is provided a data transmission method to be performed by a transmitting terminal, the method including generating an aggregated frame including a secure header, a first secure subframe, and a second secure subframe, and transmitting the generated aggregated frame to a receiving terminal. The first secure subframe may be generated using a first SFC value of the first secure subframe. The first SFC value may be included in the secure header. The second secure subframe may be generated using a second SFC value of the second secure subframe. The second SFC value may not be included in the aggregated frame, and may be generated based on the first SFC value.

The generating of the aggregated frame may include generating a first nonce based on the first SFC value and generating the first secure subframe based on the generated first nonce.

The generating of the aggregated frame may include generating the second SFC value based on the first SFC value, generating a second nonce based on the generated second SFC value, and generating the second secure subframe based on the generated second nonce.

The method may further include establishing association with the receiving terminal. The generating of the aggregated frame may be performed during the associated phase with the receiving terminal.

A method of generating the second SFC value based on the first SFC value may be predetermined between the transmitting terminal and the receiving terminal.

According to yet another aspect of the present disclosure, there is provided a transmitting terminal configured to transmit data, the transmitting terminal including a processor configured to generate an aggregated frame including a secure header, a first secure subframe, and a second secure subframe, and a communicator configured to transmit the generated aggregated frame to a receiving terminal. The first secure subframe may be generated using a first SFC value of the first secure subframe. The first SFC value may be included in the secure header. The second secure subframe may be generated using a second SFC value of the second secure subframe. The second SFC value may not be included in the aggregated frame, and may be generated based on the first SFC value.

Advantageous Effects

A method and apparatus for transmitting data is provided.
A method and apparatus for verifying integrity of received data is provided.

DETAILED DESCRIPTION OF THE INVENTION

Figure 1:
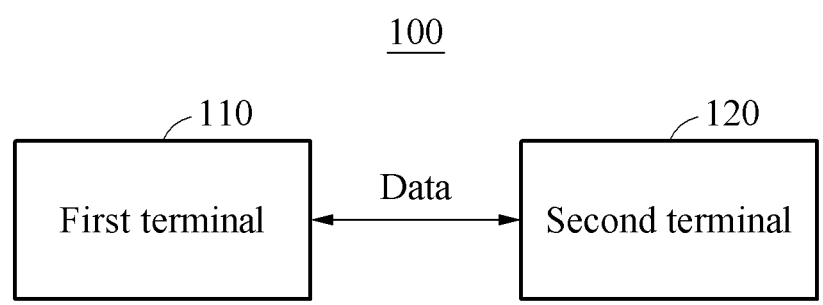
FIG. 1 is a diagram illustrating a configuration of a data exchanging system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Also, in the description of embodiments, detailed description of well-known related structures or functions will be omitted when it is deemed that such description will cause ambiguous interpretation of the present disclosure.

FIG. 1 is a diagram illustrating a configuration of a data exchanging system according to an example embodiment.

Referring to FIG. 1, a data exchanging system 100 includes a first terminal 110 and a second terminal 120. In a case that the first terminal 110 and the second terminal 120 are able to exchange data, the first terminal 110 and the second terminal 120 may be construed as being configured as a pairnet. The first terminal 110 and the second terminal 120 may exchange data through wireless communication. The wireless communication may be, for example, short-range wireless communication. In a case that the first terminal 110 transmits data to the second terminal 120, the first terminal 110 may be a transmitter and the second terminal 120 may be a receiver. Conversely, in a case that the second terminal 120 transmits data to the first terminal 110, the second terminal 120 may be a transmitter and the first terminal 110 may be a receiver.

A method of transmitting data, hereinafter simply referred to as a data transmission method, using a transmitter will be described in detail with reference to FIGS. 2, 4 through 10, and 14 through 16. A method of receiving data, hereinafter simply referred to as a data reception method, using a receiver will be described in detail with reference to FIGS. 3 and 4, 11 through 13, and 17 through 19.

Figure 2:
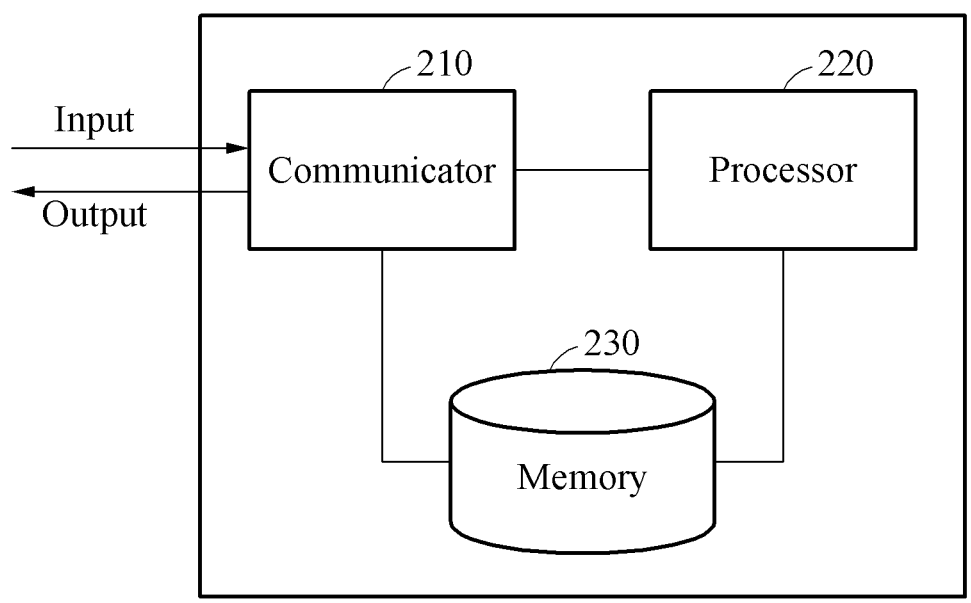
FIG. 2 is a diagram illustrating a configuration of a transmitting terminal according to an example embodiment.

FIG. 2 is a diagram illustrating a configuration of a transmitting terminal according to an example embodiment.

Referring to FIG. 2, a transmitting terminal 200 includes a communicator 210, a processor 220, and a memory 230. The transmitting terminal 200 may correspond to the first terminal 110 or the second terminal 120 described with reference to FIG. 1. For example, the communicator 210, the processor 220, and the memory 230 may be embodied by a system-on-chip (SoC), but not limited thereto.

The communicator 210 may be connected to the processor 220 and the memory 230 to transmit and receive data. The communicator 210 may be connected to an external device to transmit and receive data.

The communicator 210 may be embodied as a circuitry in the transmitting terminal 200. For example, the communicator 210 may include an internal bus and an external bus. For another example, the communicator 210 may be an element configured to connect the transmitting terminal 200 to an external device. The communicator 210 may be an interface. The communicator 210 may receive data from an external device, and transmit the received data to the processor 220 and the memory 230.

The processor 220 may process data received by the communicator 210 and data stored in the memory 230. A term "processor" used herein refers to a data processing device embodied as hardware including a circuit having a physical structure to implement desired operations. For example, the desired operations may include a code included in a program or instructions. For example, the data processing device embodied as hardware may include a microprocessor, a central processing unit, a processor core, a multi-core processor, a multiprocessor, an application-specific integrated circuit (ASIC), and a field programmable gate array (FPGA).

The processor 220 may implement a computer-readable code, for example, software, stored in a memory, for example, the memory 230, or instructions induced by the processor 220.

The memory 230 may store data received by the communicator 210 and data processed by the processor 220. For example, the memory 230 may store a program. The program to be stored may be a set of pieces of syntax that may be implemented by the processor 220 by being coded to generate data and transmit the generated data.

The memory 230 may include, for example, at least one volatile memory, a nonvolatile memory, a random access memory (RAM), a flash memory, a hard disk drive, and an optical disc drive.

The memory 230 may store a set of instructions or commands, for example, software, to operate the transmitting terminal 200. The set of the instructions to operate the transmitting terminal 200 may be implemented by the processor 220.

The communicator 210, the processor 220, and the memory 230 will be described in more detail with reference to FIGS. 4 through 10 and 14 through 16.

Figure 3:
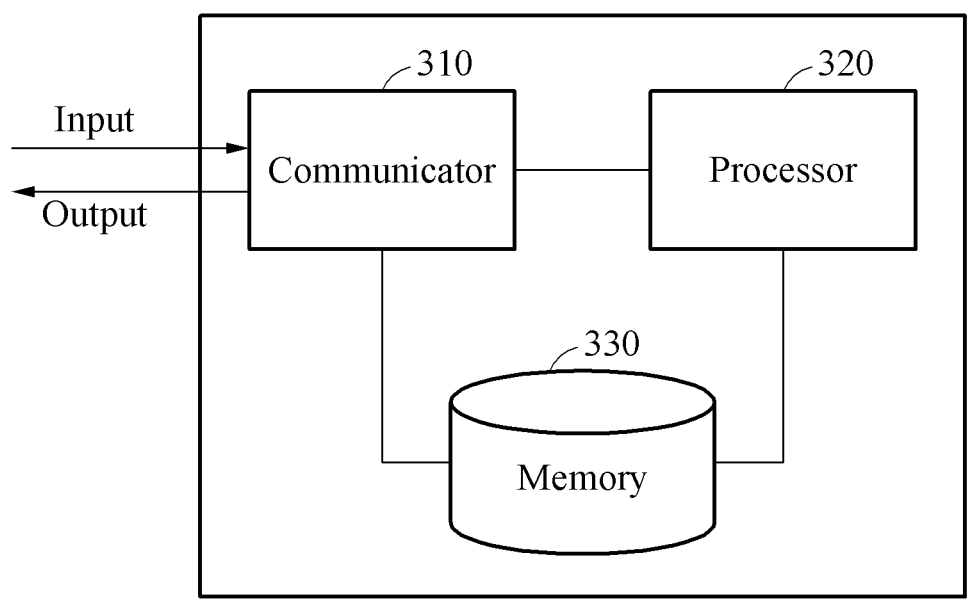
FIG. 3 is a diagram illustrating a configuration of a receiving terminal according to an example embodiment.

FIG. 3 is a diagram illustrating a configuration of a receiving terminal according to an example embodiment.

Referring to FIG. 3, a receiving terminal 300 includes a communicator 310, a processor 320, and a memory 330. The receiving terminal 300 may correspond to the first terminal 110 or the second terminal 120 described with reference to FIG. 1. For example, the communicator 310, the processor 320, and the memory 330 may be embodied by an SoC, but not limited thereto.

The communicator 310 may be connected to the processor 320 and the memory 330 to transmit and receive data. The communicator 310 may be connected to an external device to transmit and receive data.

The communicator 310 may be embodied as a circuitry in the receiving terminal 300. For example, the communicator 310 may include an internal bus and an external bus. For another example, the communicator 310 may be an element configured to connect the receiving terminal 300 to an external device. The communicator 310 may be an interface. The communicator 310 may receive data from an external device, and transmit the received data to the processor 320 and the memory 330.

The processor 320 may process data received by the communicator 310 and data stored in the memory 330. The processor 320 may implement a computer-readable code, for example, software, stored in a memory, for example, the memory 330, or instructions induced by the processor 320.

The memory 330 may store data received by the communicator 310 and data processed by the processor 320. For example, the memory 330 may store a program. The program to be stored may be a set of pieces of syntax that may be implemented by the processor 320 by being coded to receive data.

The memory 330 may include, for example, at least one volatile memory, a nonvolatile memory, a RAM, a flash memory, a hard disk drive, and an optical disc drive.

The memory 330 may store a set of instructions or commands, for example, software, to operate the receiving terminal 300. The set of the instructions to operate the receiving terminal 300 may be implemented by the processor 320.

The communicator 310, the processor 320, and the memory 330 will be described in more detail with reference to FIGS. 4, 11 through 13, and 17 through 19.

Figure 4:
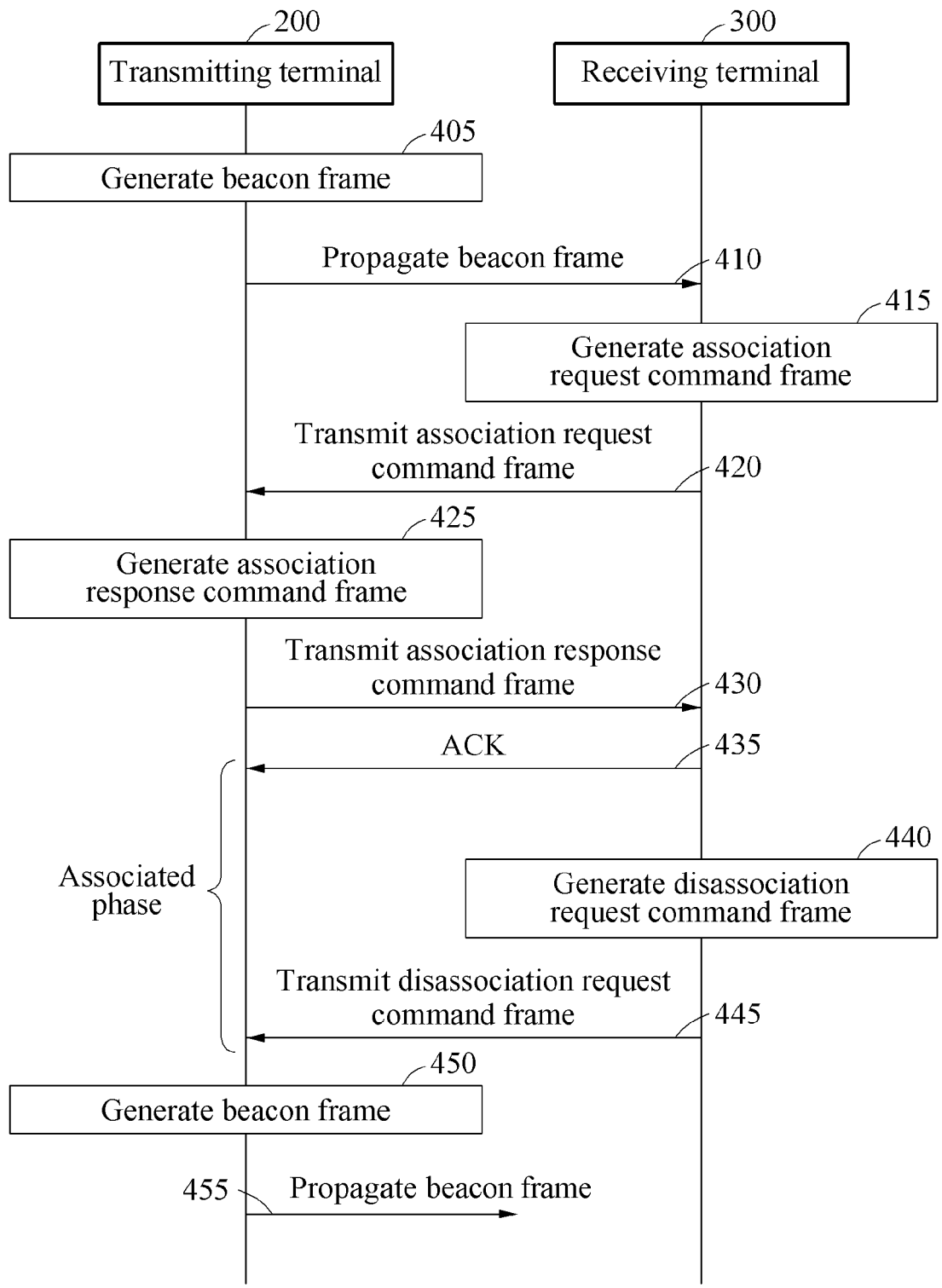
FIG. 4 is a flowchart illustrating a signal flow in a method of establishing association between a transmitting terminal and a receiving terminal according to an example embodiment.

FIG. 4 is a flowchart illustrating a signal flow in a method of establishing association between a transmitting terminal and a receiving terminal according to an example embodiment.

Referring to FIG. 4, in operation 405, in a case of the transmitting terminal 200 being an access point (AP), the processor 220 of the transmitting terminal 200 generates a beacon frame. The beacon frame may include pieces of information needed for a communication connection when an external terminal desires to communicate with the transmitting terminal 200. Although the transmitting terminal 200 is described as the AP with reference to FIG. 4, the receiving terminal 300 may be the AP based on an example embodiment. That is, in a case that the AP receives data from a user terminal, the AP may be the receiving terminal 300 and the user terminal may be the transmitting terminal 200.

In operation 410, the communicator 210 of the transmitting terminal 200 propagates the beacon frame. The transmitting terminal 200 propagating the beacon frame may function as the AP. The communicator 210 may propagate the beacon frame through a specific channel. The communicator 310 of the receiving terminal 300 may receive the propagated beacon frame.

In operation 415, the processor 320 of the receiving terminal 300 generates an association request command frame. The processor 320 may generate the association request command frame based on information included in a beacon frame.

In operation 420, the communicator 310 of the receiving terminal 300 transmits the association request command frame to the transmitting terminal 200. The communicator 210 of the transmitting terminal 200 may receive the association request command frame.

In operation 425, the processor 220 of the transmitting terminal 200 generates an association response command frame in response to the association request command frame.

In operation 430, the communicator 210 of the transmitting terminal 200 transmits the association response command frame to the receiving terminal 300.

In operation 435, the communicator 310 of the receiving terminal 300 transmits an acknowledgement (ACK) to the transmitting terminal 200. A state subsequent to operation 435 may be construed as a state in which association is established (associated phase).

The transmitting terminal 200 may establish one-to-one association with the receiving terminal 300. When the one-to-one association is established between the transmitting terminal 200 and the receiving terminal 300, the transmitting terminal 200 may not generate a beacon frame until the association is terminated.

During the associated phase between the transmitting terminal 200 and the receiving terminal 300, data may be exchanged therebetween. The data to be exchanged may be, for example, a data frame.

In operation 440, in a case that the receiving terminal 300 desires to terminate the association, the processor 320 of the receiving terminal 300 generates a disassociation request command frame. Although, in FIG. 4, operation 440 of generating the disassociation request command frame is performed by the receiving terminal 300, the transmitting terminal 200 may also generate the disassociation request command frame.

In operation 445, the communicator 310 of the receiving terminal 300 transmits the dissociation request command frame to the transmitting terminal 200. When the transmitting terminal 200 receives the disassociation request command frame, the established association may be ended. Although, in FIG. 4, operation 445 of transmitting the disassociation request command frame is performed by the receiving terminal 300, the transmitting terminal 200 may also transmit the disassociation request command frame.

In a case that there is no device associated with the transmitting terminal 200, the transmitting terminal 200 may perform operations 450 and 455. Operations 450 and 455 may correspond to operations 405 and 410 described in the foregoing.

Hereinafter, a data transmission method and a data reception method will be described in detail with reference to FIGS. 5 through 19.

Figure 5:
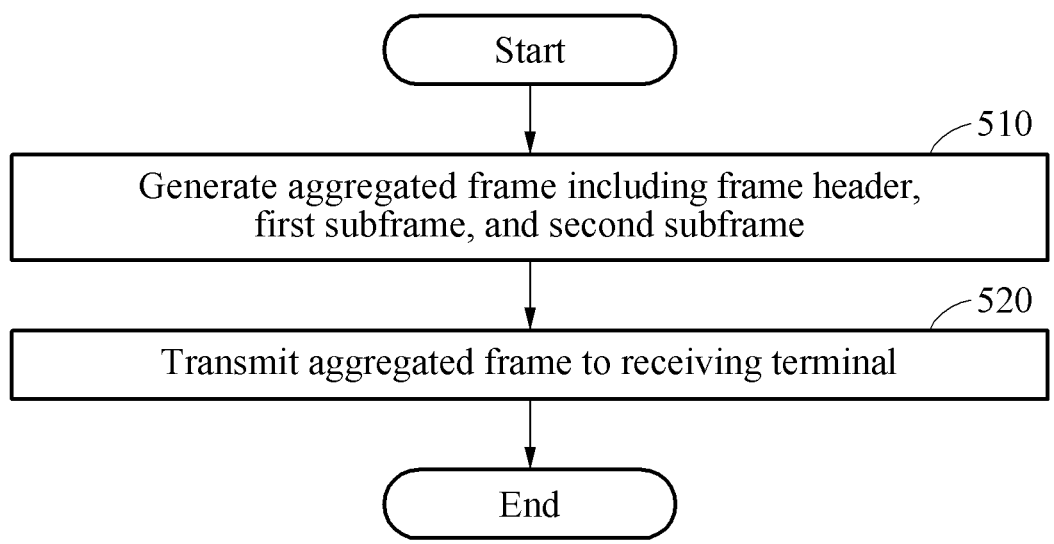
FIG. 5 is a flowchart illustrating a data transmission method according to an example embodiment.

FIG. 5 is a flowchart illustrating a data transmission method according to an example embodiment.

Referring to FIG. 5, in operation 510, the processor 220 of the transmitting terminal 200 generates an aggregated frame including a frame header, a first subframe, and a second subframe. The aggregated frame may be a media access control (MAC) frame. The frame header may be a MAC header. The aggregated frame may include a plurality of subframes associated with data to be transmitted. The aggregated frame may be one of a command frame and a data frame. A method of generating such an aggregated frame will be described hereinafter with reference to FIGS. 6 through 9.

In operation 520, the communicator 210 of the transmitting terminal 200 transmits the generated aggregated frame to the receiving terminal 300. For example, the communicator 210 may transmit the aggregated frame to the receiving terminal 300 using short-range wireless communication.

According to an example embodiment, in a case of the aggregated frame being the data frame, the communicator 210 may transmit the aggregated frame to the receiving terminal 300 only when association between the transmitting terminal 200 and the receiving terminal 300 is established. A method of establishing association between the transmitting terminal 200 and the receiving terminal 300 is described with reference to FIG. 4, and thus a more detailed and repeated description is omitted here for brevity.

Figure 6:
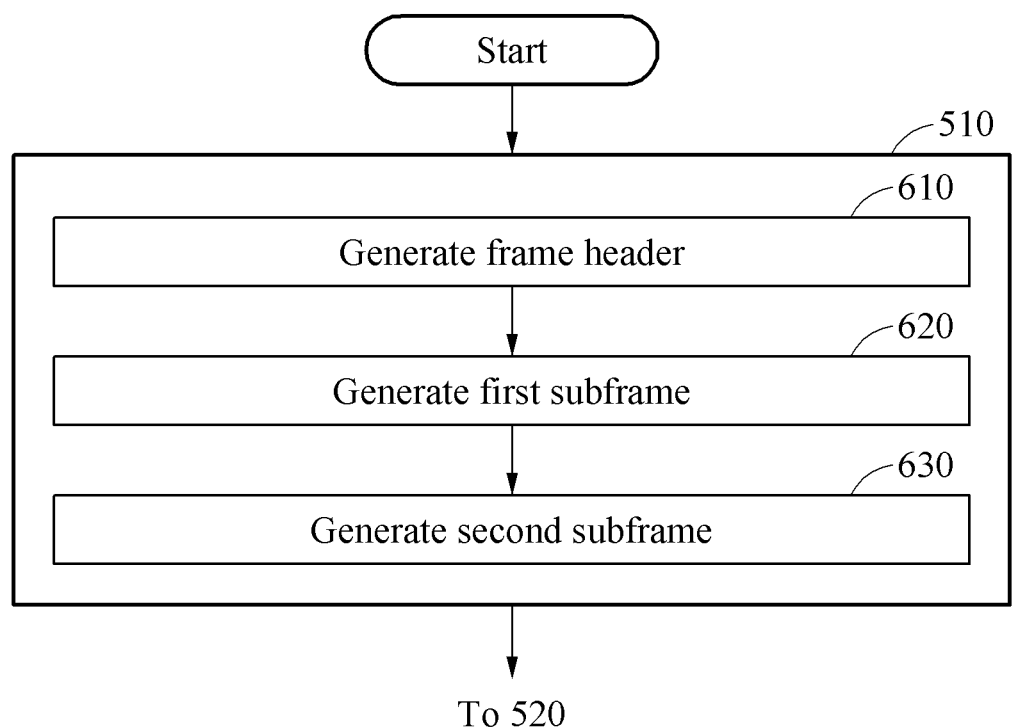
FIG. 6 is a flowchart illustrating a method of generating a frame according to an example embodiment.

FIG. 6 is a flowchart illustrating a method of generating an aggregated frame according to an example embodiment.

Operation 510 described with reference to FIG. 5 may include operations 610, 620, and 630 to be described hereinafter with reference to FIG. 6.

Referring to FIG. 6, in operation 610, the processor 220 of the transmitting terminal 200 generates the frame header. The frame header may be a MAC header of a MAC frame. The frame header may further include a secure header. The secure header may include a first secure frame counter (SFC) value of the first subframe.

A structure of such a frame header will be described in detail with reference to FIG. 7.

In operation 620, the processor 220 generates the first subframe. The first subframe may be a portion of data to be included in a body of the MAC frame.

In operation 630, the processor 220 generates the second subframe. The second subframe may be a portion of the data to be included in the body of the MAC frame. In the aggregated frame, the second subframe may be located subsequent to the first subframe. A payload of the aggregated frame may be generated based on a plurality of subframes including the first subframe and the second subframe. A structure of each of the first subframe and the second subframe will be described in detail with reference to FIGS. 7 through 9.

Figure 7:
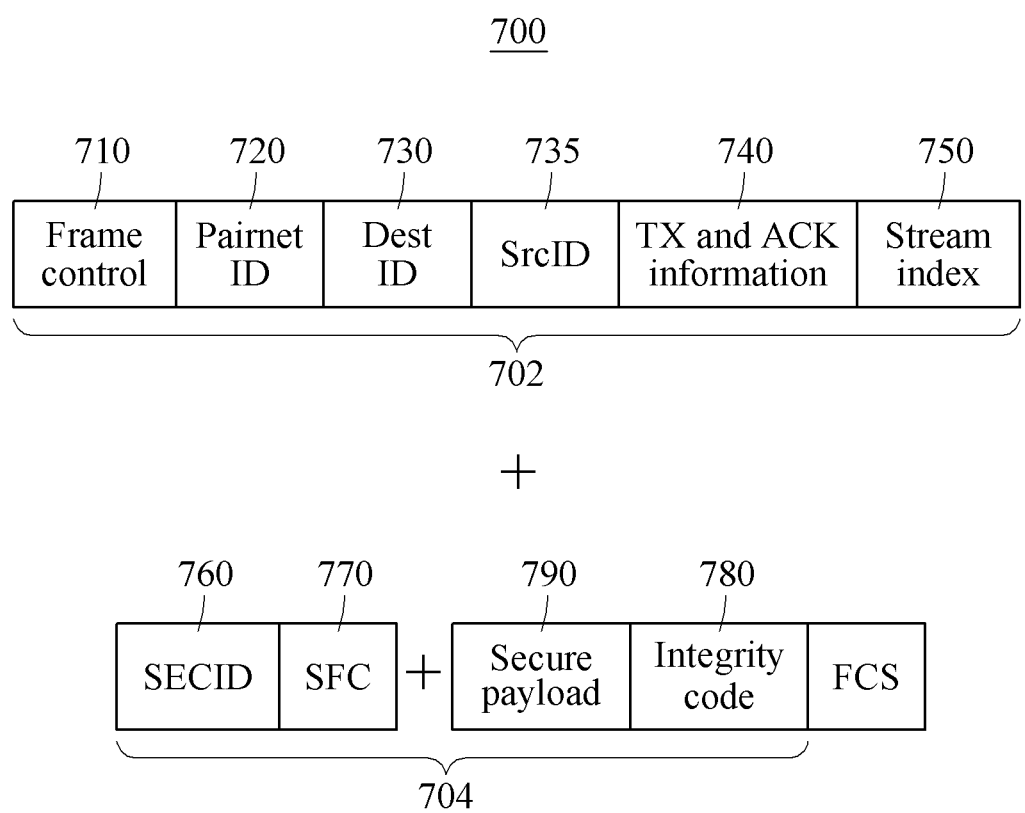
FIG. 7 is a diagram illustrating an example of a frame according to an example embodiment.

FIG. 7 is a diagram illustrating an example of a frame according to an example embodiment.

Referring to FIG. 7, a frame 700 includes a frame header 702 and a frame body 704. The frame 700 may be a MAC frame, and it may be a data frame.

The frame header 702 includes a frame control field 710, a pairnet identifier (ID) field 720, a destination ID (DestID) field 730, a source ID (SrcID) field 735, a transmission (TX) and ACK information field 740, and a stream index field 750.

The frame control field 710 may be 2 octets, and include a protocol version field, a frame type field, a securities and exchange commission (SEC) field, an ACK policy field, and a logical channel field.

The pairnet ID field 720 may include a unique ID of a pairnet. The pairnet may include the transmitting terminal 200 and the receiving terminal 300.

The DestID field 730 may include information indicating the receiving terminal 300.

The SrcID field 735 may include information indicating the transmitting terminal 200.

The TX and ACK information field 740 may include a field indicating the number of subframes, a field indicating a type of a recently received frame, a buffer full field, a buffer empty field, and a device sleep (DEVsleep) field.

The frame body 704 includes a secure session ID (SECID) field 760, an SFC field 770, an integrity code field 780, and a secure payload field 790.

The SECID field 760 may include an ID of a key to be used to protect a corresponding frame, and the key may be used to encrypt or decrypt data in the frame and also used to verify integrity of the data. The SECID field 760 may be 2 octets.

The SFC field 770 may include a counter to ensure an uniqueness of a nonce of a frame. An SFC value may be set for each frame or each subframe of each aggregated frame. Since an SFC value is set differently for each frame or each subframe of each aggregated frame, a nonce of a frame or a subframe may have a unique value. For example, a different SFC value may be used for each frame or each subframe so that a different nonce is permanently generated for a certain key.

Although a time token increases, an SFC value determined for a subframe may not be reset. For example, in a case that a roll over in which an SFC value increases by 1 for each subframe and a same SFC value repeats for a same key occurs, re-keying may need to be performed at a point in time at which the roll over occurs. The re-keying means changing a key between the transmitting terminal 200 and the receiving terminal 300. In a case that the SFC field 770 indicating an SFC value is 6 octets, the number of SFC values to be determined for a single key may be $2^{48}$, and thus the re-keying may not occur before a life time of the key is actually terminated.

The integrity code field 780 may include integrity verification information to verify integrity of the frame header 702 and a payload of the frame 700. The integrity verification information may be generated by a Galois/counter mode (GCM) operation.

The secure payload field 790 may include secure data. The secure data may be encrypted data. The processor 220 of the transmitting terminal 200 may generate the secure data by encrypting data using a key and a unique nonce for a frame or a subframe. For example, the processor 220 may encrypt the data using an advanced encryption standard (AES) algorithm.

The generating of the integrity verification information and the generating of the secure data may be performed in parallel. For example, the generating of the integrity verification information and the generating of the secure data may be performed simultaneously.

A plurality of subframes may be generated based on the integrity code field 780 and the secure payload field 790, and an aggregated data frame payload may be generated by aggregating the plurality of subframes. Hereinafter, a frame body including such an aggregated frame payload will be described in detail with reference to FIG. 8.

Figure 8:
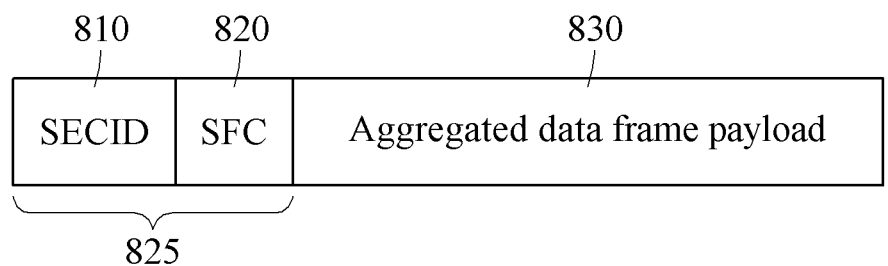
FIG. 8 is a diagram illustrating an example of a frame body according to an example embodiment.

FIG. 8 is a diagram illustrating an example of a frame body according to an example embodiment.

Referring to FIG. 8, a frame body 800 includes an SECID field 810, an SFC field 820, and an aggregated data frame payload 830. The SECID field 810 and the SFC field 820 may correspond to the SECID field 760 and the SFC field 770 described with reference to FIG. 7. The SECID field 810 and the SFC field 820 are referred to as a secure header field 825. The SECID field 810 may be 2 octets, and the SFC field 820 may be 6 octets. Based on an example embodiment, the secure header field 825 or a secure header may be defined to be included in a frame header.

The aggregated data frame payload 830 may be generated based on the integrity code field 780 and the secure payload field 790 described with reference to FIG. 7. For example, the processor 220 of the transmitting terminal 200 may encrypt a payload of each subframe in an aggregated data frame consists of plurality of subframes which include a subheader, a payload, and a frame check sequence (FCS) and on which secure processing is not performed. The processor 220 may include a secure payload generated for each subframe in the aggregated data frame, in lieu of an original payload that is not encrypted. The processor 220 may generate the secure payload to include a plurality of secure subframes configured by generating integrity verification information of each subframe and adding the generated integrity verification frame to each subframe.

Hereinafter, a plurality of subframes and integrity verification information of each of the subframes will be described in detail with reference to FIG. 9.

Figure 9:
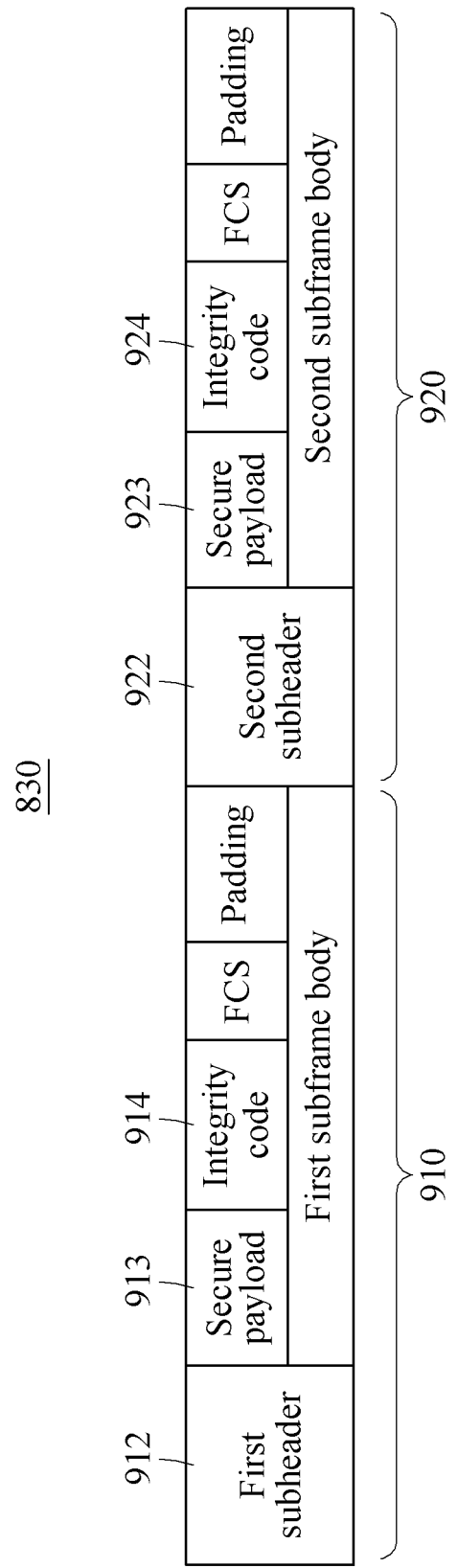
FIG. 9 is a diagram illustrating an example of a payload of an aggregated frame according to an example embodiment.

FIG. 9 is a diagram illustrating an example of a payload of a frame according to an example embodiment.

Referring to FIG. 9, the aggregated data frame payload 830 includes a first subframe 910 and a second subframe 920. Based on a size of data to be transmitted, the aggregated data frame payload 830 may include a plurality of subframes.

The SFC field 820 illustrated in FIG. 8 may include an SFC value of the first subframe 910. The SFC value of the first subframe 910 is also referred to as a first SFC value. For a same key value, different SFC values may be used for subframes. Using a same key although the subframes are included in different MAC frames, different SFC values may be used for subframes. In a case that an SFC field indicating an SFC value is 6 octets, $2^{48}$ different SFC values may be used with respect to a same key. The 6 octet SFC value may be used without being rolled over during a certain AES key life time. That is, since a point in time at which an SFC roll over occurs may be a point in time at which the AES key life time is terminated or after the point in time, early re-keying due to the SFC roll over may not occur prior to the AES key life time terminates. For example, in a case of using a 128 bit AES key, it is recommended that the number of encrypting times for a same key be performed less than or equal to $2^{48}$. In such a case, encryption may be performed for $2^{48}$ or less packets using a single key. In such a case, $2^{48}$ or less SFC values may be needed for the single key, and thus 6 octets may be sufficient for an SFC field. In a case that $2^{48}$ SFC values are generated, a probability of occurrence of such a roll over in which a same SFC value is generated for a same key may be extremely low.

The secure header 825 illustrated in FIG. 8 may be included in the frame body 800 without being included in a certain subframe, and located between the MAC header 702 and the first subframe 910.

The first subframe 910 includes a first subheader 912 and a first subframe body. The first subheader 912 may be a first MAC subheader, and 4 octets. The first subframe body includes a first secure payload 913 field, an integrity code field 914, an FCS field, and a padding field. The integrity code field 914 may be 16 octets, and the FCS field may be 4 octets.

The first secure payload 913 may be encrypted data generated based on the first SFC value. For example, the first secure payload 913 may be generated based on an encryption key, a first nonce, and data to be encrypted. The encryption key to be used may be identified by the SECID field 810 included in the secure header 825 of the aggregated frame. The first nonce may be configured based on a unique ID and a first SFC value. The unique ID may include a device address such as, for example, a MAC address, of the transmitting terminal 200. In a case that a field including the unique ID is 6 octets and a field including the first SFC value is 6 octets, the first nonce may be configured to be 12 octets. In a case that the receiving terminal 300 receives the first secure payload 913, the receiving terminal 300 may obtain an SFC value of the aggregated frame from the SFC field 820 included in the secure header 825 of the received aggregated frame. The receiving terminal 300 may generate the first nonce by combining the obtained SFC value with the device address of the transmitting terminal 200. The receiving terminal 300 may identify a key used when the aggregated frame is encrypted from the SECID field 810 included in the secure header 825 of the received aggregated frame. The receiving terminal 300 may decrypt the first secure payload based on the identified key and the first nonce.

The integrity code field 914 may include first integrity verification information. The first integrity verification information may be generated by a GCM operation. As an input for the GCM operation to generate the first integrity verification information, the frame header 700, the SECID field 810, the SFC field 820, and the first subheader 912, and a first payload to be encrypted and included in the first subframe 910 may be used. Here, the encryption may be applied only to the first payload, and the encrypted first payload may be included in the secure payload field 913. The generated first integrity verification information may be included in the integrity code field 914. The processor 220 may generate an FCS associated with the SECID field 810, the SFC field 770, the secure payload field 913, and the integrity code field 914, and include the generated FCS in the FCS field. Also, padding to match the first subframe 910 to a certain octet boundary, for example, a 4 octet unit, may be added to the first subframe 910.

The second subframe 920 includes a second subheader 922 and a second subframe body. The second subheader 922 may be a second MAC subheader, and 4 octets. The second subframe body includes a second secure payload 923, an integrity code field 924, an FCS field, and a padding field. The integrity code field 924 may be 16 octets and the FCS field may be 4 octets.

The second secure payload 923 may be encrypted data generated based on a second SFC value. For example, a second secure payload may be generated based on an encryption key, a second nonce, and data to be encrypted. The second nonce may be configured based on a unique ID of the transmitting terminal 200 and the second SFC value. The second SFC value may be generated based on the first SFC value. For example, the second SFC value may be generated by adding a preset value, for example, 1, to the first SFC value. Using different SFC values for a plurality of subframes, a nonce of each subframe may have uniqueness. In a case that the receiving terminal 300 receives the second secure payload, the receiving terminal 300 may generate a second nonce based on information included in the secure header 825 of the received aggregated frame, and decrypt the second secure payload based on the generated second nonce.

The integrity code field 924 may include second integrity verification information. The second integrity verification information may be generated by the GCM operation. As an input for the GCM operation, the second subheader 922 and a second payload to be encrypted and included in the second subframe 920 may be used.

The encryption may be applied only to the second payload, and the encrypted second payload may be included in the secure payload field 923. The generated second integrity verification information may be included in the integrity code field 924. The processor 220 may generate an FCS associated with the secure payload field 923 and the integrity code field 924 of the second subframe body, and include the generated FCS in the FCS field. A padding to match the second subframe 920 to a certain octet boundary may be added to the second subframe 920.

Figure 10:
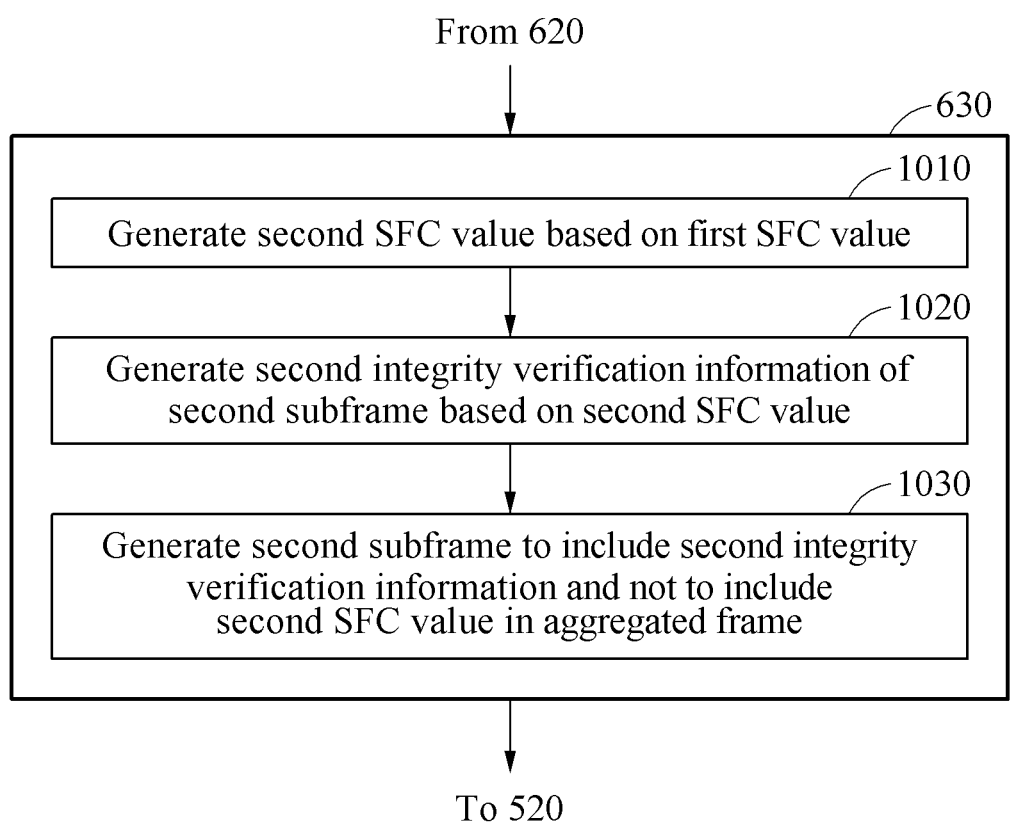
FIG. 10 is a flowchart illustrating a method of generating a second subframe according to an example embodiment.

FIG. 10 is a flowchart illustrating a method of generating a second subframe according to an example embodiment.

Operation 640 described with reference to FIG. 6 may include operations 1010, 1020, and 1030 to be described hereinafter with reference to FIG. 10.

Referring to FIG. 10, in operation 1010, the processor 220 of the transmitting terminal 200 generates a second SFC value based on a first SFC value. A method of generating the second SFC value based on the first SFC value may be predetermined between the transmitting terminal 200 and the receiving terminal 300. For example, a value obtained by adding 1 to the first SFC value may be predetermined to be the second SFC value. The transmitting terminal 200 and the receiving terminal 300 may preset the value obtained by adding 1 to the first SFC value to be the second SFC value.

In operation 1020, the processor 220 generates second integrity verification information of the second subframe based on the generated second SFC value. The processor 220 generates a second nonce of the second subframe based on the second SFC value, and generates a second secure payload based on the generated second nonce. The processor 220 generates the second integrity verification information using a GCM operation. As an input for the GCM operation, a second subheader and a second payload to which encryption is to be applied may be used.

The processor 220 may perform the encryption on the second payload of the second subframe, in parallel with the generating of the second integrity verification information. For example, the processor 220 may generate the second integrity verification information and encrypt the second payload, simultaneously.

In operation 1030, the processor 220 generates the second subframe to include the second integrity verification information and not to include the second SFC value in the aggregated frame. The second subframe may include an encrypted second secure payload.

Figure 11:
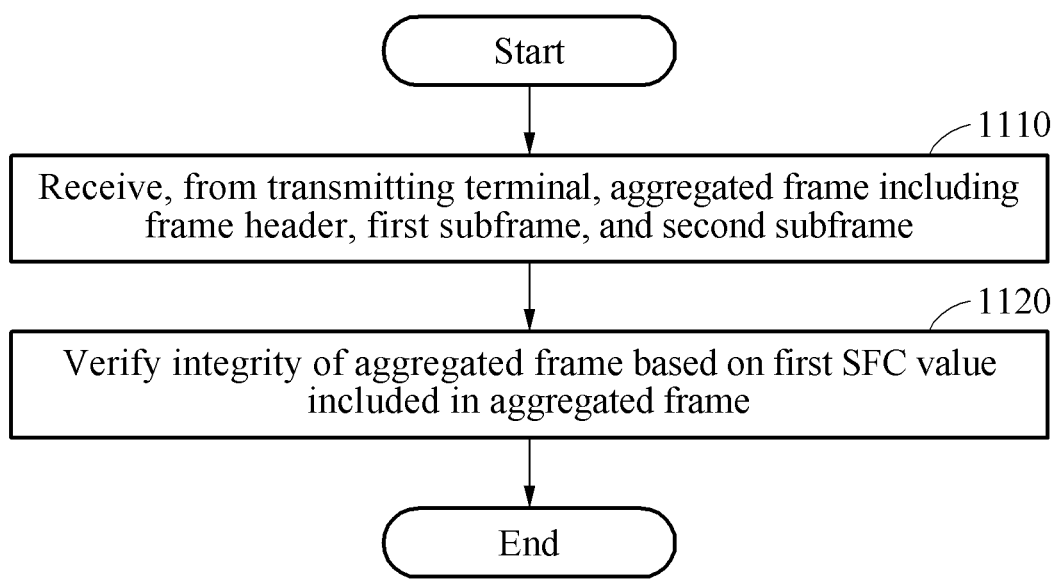
FIG. 11 is a flowchart illustrating a method of verifying integrity of an aggregated frame according to an example embodiment.

FIG. 11 is a flowchart illustrating a method of verifying integrity of an aggregated frame according to an example embodiment.

Operations 1110 and 1120 to be described hereinafter with reference to FIG. 11 may be performed by the receiving terminal 300 included in a pairnet along with the transmitting terminal 200.

Referring to FIG. 11, in operation 1110, the communicator 310 of the receiving terminal 300 receives, from the transmitting terminal 200, an aggregated frame including a frame header, a first subframe, and a second subframe. Based on an example embodiment, the aggregated frame may further include a secure header including an SECID field and an SFC field, and the secure header may be defined to be included in the frame header. A first SFC value may be included in the SFC field of the secure header. The secure header may not be included in a certain subframe, and be located between a MAC header and the first subframe. The aggregated frame may be the frame 700 described with reference to FIGS. 7 through 9.

In operation 1120, the processor 320 of the receiving terminal 300 verifies integrity of the aggregated frame based on the first SFC value included in the secure header. The processor 320 may verify the integrity of the aggregated frame, in parallel with decrypting a secure payload in each subframe. For example, the processor 320 may verify the integrity of the aggregated frame and decrypt the secure payload, simultaneously. When the integrity of the aggregated frame is verified or determined, the decrypted payload may be used by the receiving terminal 300.

A method of verifying the integrity of the aggregated frame will be described in more detail with reference to FIGS. 12 and 13.

Figure 12:
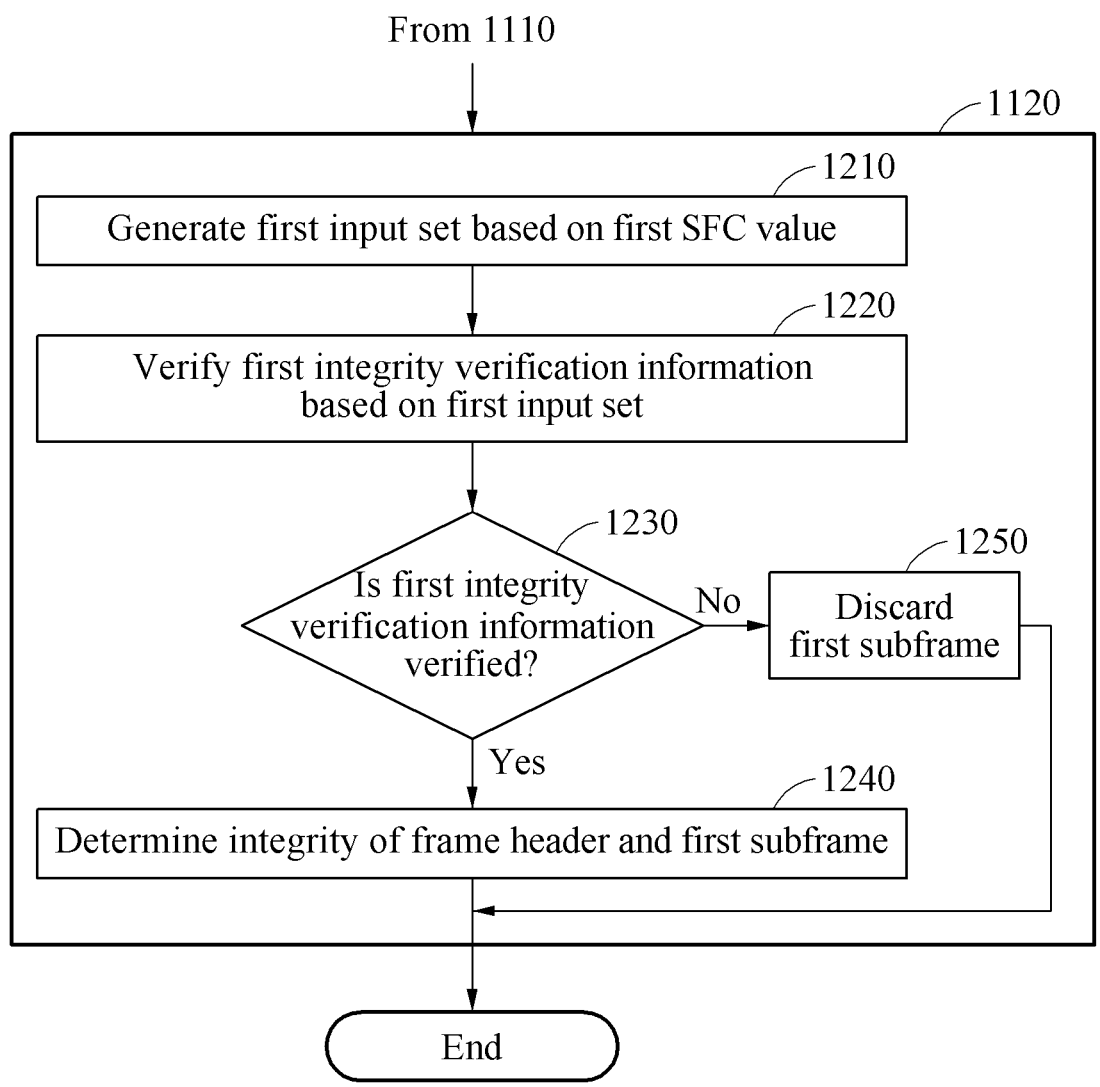
FIG. 12 is a flowchart illustrating a method of determining integrity of a first subframe according to an example embodiment.

FIG. 12 is a flowchart illustrating a method of determining integrity of a first subframe according to an example embodiment.

Operation 1120 described with reference to FIG. 11 may include operations 1210 through 1250 to be described hereinafter with reference to FIG. 12.

Referring to FIG. 12, in operation 1210, the processor 320 of the receiving terminal 300 generates a first input set to verify integrity of the received first subframe based on the first SFC value. For example, the first input set may include the frame header 702 illustrated in FIG. 7, the SECID field 810 and the SFC field 820 illustrated in FIG. 8, and the first subheader 912, the first secure payload 913, and the integrity code field 914 illustrated in FIG. 9. The first SFC value may be a unique SFC value explicitly included in the received aggregated frame. The first SFC value may be a unique value of the first subframe for a current key. The first input set may be used to decrypt the first subframe.

In operation 1220, the processor 320 verifies first integrity verification information based on the first input set. For example, the processor 320 may verify the first integrity verification information using a symmetric GCM operation corresponding to the GCM operation described with reference to FIG. 9. The processor 320 may decrypt the first subframe based on the first input set.

In operation 1230, the processor 320 determines whether the first integrity verification information is verified. In response to the first integrity verification information being verified, operation 1240 may be performed. Conversely, in response to the first integrity verification information not being verified, operation 1250 may be performed.

In operation 1250, in response to the first integrity verification information not being verified, the processor 320 discards the received first subframe and all subframes subsequent to the first subframe that are included in the aggregated frame.

In operation 1240, in response to the first integrity verification information being verified, the processor 320 determines that integrity of the frame header, the secure header, and the first subframe is verified.

During the GCM operation, verifying integrity and decryption may be performed simultaneously. In response to the integrity of the first subframe being verified, a decrypted first payload in the first subframe may be used by the receiving terminal 300. A process of decrypting a first secure payload may be performed in an inverse order of a process of generating the first secure payload 913 described with reference to FIG. 9. The decryption may be performed as follows.

The processor 320 may generate a first nonce based on the received first SFC value. The first nonce to be generated by the processor 320 may be the same as the first nonce generated by the processor 220 of the transmitting terminal 200 described with reference to FIG. 8. The first nonce may include a unique ID and the first SFC value. The unique ID may include a device address of the transmitting terminal 200.

The processor 320 may decrypt the first secure payload based on the generated first nonce. For example, the processor 320 may decrypt the first secure payload based on an encryption key and the first nonce. The encryption key to be used may be identified by an SECID included in the secure header of the received aggregated frame.

Figure 13:
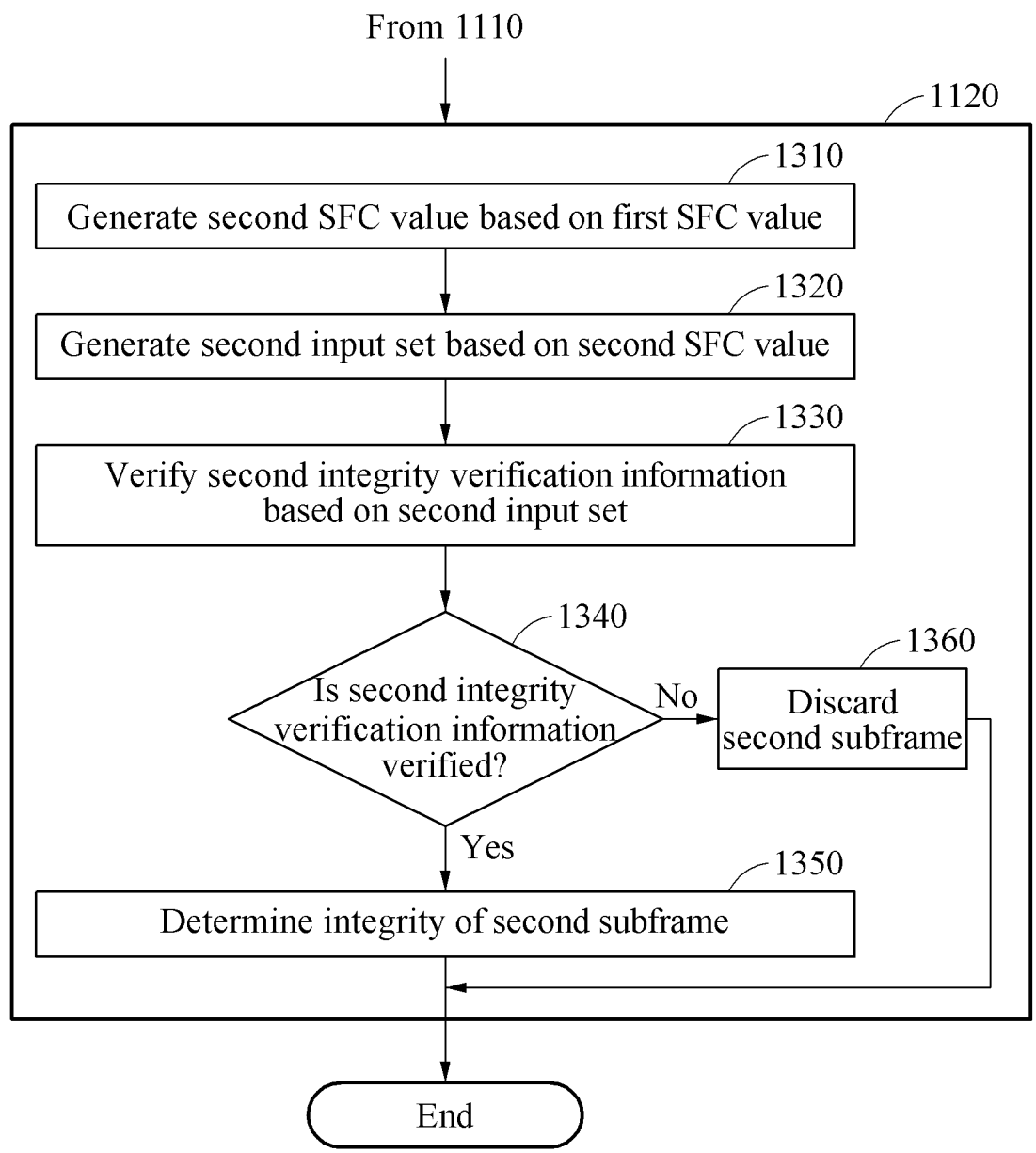
FIG. 13 is a flowchart illustrating a method of determining integrity of a second subframe according to an example embodiment.

FIG. 13 is a flowchart illustrating a method of determining integrity of a second subframe according to an example embodiment.

When the integrity of the first subframe of the aggregated frame is verified, integrity of the second subframe may also be verified. Operation 1120 described with reference to FIG. 11 may include operations 1310 through 1360 to be described hereinafter with reference to FIG. 13.

Referring to FIG. 13, in operation 1310, the processor 320 of the receiving terminal 300 generates a second SFC value based on the first SFC value. The second SFC value may be a unique value of the second subframe for a current key. The processor 320 may generate the second SFC value by adding a preset value, for example, 1, to the first SFC value. A method of generating the second SFC value based on the first SFC value may be predetermined between the transmitting terminal 200 and the receiving terminal 300. For example, generating the second SFC value by adding 1 to the first SFC value may be preset.

In operation 1320, the processor 320 generates a second input set to verify the integrity of the second subframe based on the generated second SFC value. For example, the second input set may include the second subheader 922, the second secure payload 912, and the integrity code field 924 illustrated in FIG. 9. The second input set may be used to decrypt the second subframe.

In operation 1330, the processor 320 verifies second integrity verification information based on the generated second input set. For example, the processor 320 may verify the second integrity verification information using a symmetric GCM operation corresponding to the GCM operation described with reference to FIG. 9. The processor 320 may decrypt the second subframe based on the second input set.

In operation 1340, the processor 320 determines whether the second integrity verification information is verified. In response to the second integrity verification information being verified, operation 1350 may be performed. Conversely, in response to the second integrity verification information not being verified, operation 1360 may be performed.

In operation 1360, in response to the second integrity verification information not being verified, the processor 320 discards the received second subframe and all subframes subsequent to the second subframe that are included in the aggregated frame.

In operation 1350, in response to the second integrity verification information being verified, the processor 320 determines that the integrity of the second subframe is verified.

During the GCM operation, verifying integrity and decryption may be performed simultaneously. In response to the integrity of the second subframe being verified, a decrypted second payload in the second subframe may be used by the receiving terminal 300.

The decryption may be performed as follows.

The processor 320 may generate a second nonce based on the second SFC value. The second nonce to be generated by the processor 320 may be the same as the second nonce generated by the processor 220 of the transmitting terminal 200 described with reference to FIG. 9. The second nonce may include a unique ID and the second SFC value.

The processor 320 may decrypt a second secure payload based on the generated second nonce. For example, the processor 320 may decrypt the second secure payload based on an encryption key and the second nonce. The encryption key to be used may be identified by an SECID included in the secure header of the aggregated frame.

Figure 14:
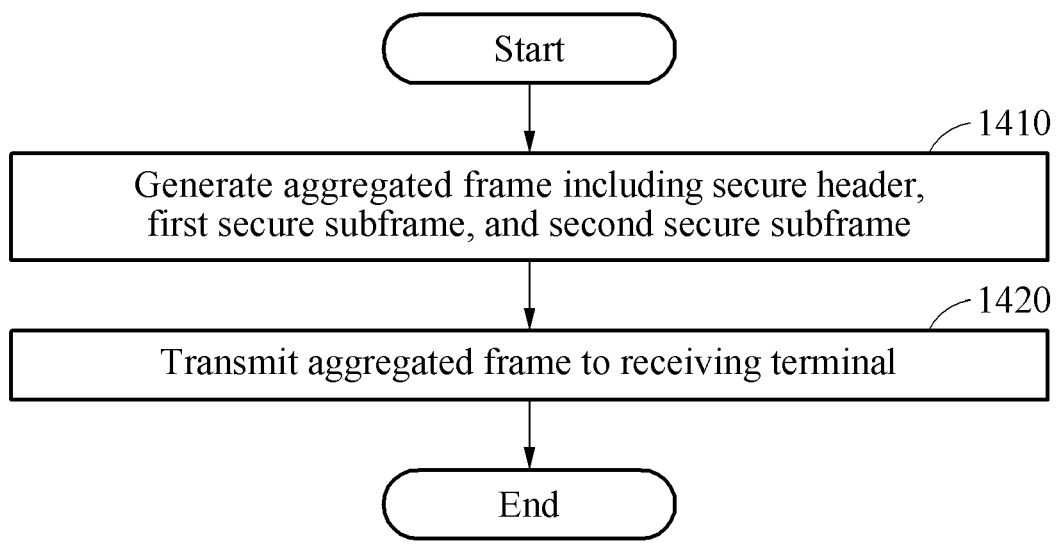
FIG. 14 is a flowchart illustrating a data transmission method according to another example embodiment.

FIG. 14 is a flowchart illustrating a data transmission method according to another example embodiment.

Operations 1410 and 1420 to be performed to transmit data may be performed by the transmitting terminal 200 described with reference to FIG. 2.

Referring to FIG. 14, in operation 1410, the processor 220 of the transmitting terminal 200 generates an aggregated frame including a secure header, a first secure subframe, and a second secure subframe. The secure header is described with reference to FIGS. 6 through 13, and thus a more detailed and repeated description will be omitted here for brevity. A secure subframe refers to a subframe including a secure payload. The secure payload refers to encrypted data.

According to an example embodiment, the aggregated frame may explicitly include a first SFC value indicating uniqueness of the first secure subframe, and not include a second SFC value indicating uniqueness of the second secure subframe. A method of generating the first secure subframe and the second secure subframe will be described in detail with reference to FIGS. 15 and 16.

In operation 1420, the communicator 210 of the transmitting terminal 200 transmits the generated aggregated frame to a receiving terminal. For example, the communicator 210 may transmit the aggregated frame to the receiving terminal using short-range wireless communication. The receiving terminal described in the foregoing may be the receiving terminal 300 described with reference to FIG. 3.

According to an example embodiment, in a case of the aggregated frame being a data frame, the communicator 210 may transmit the aggregated frame to the receiving terminal 300 only when association between the transmitting terminal 200 and the receiving terminal 300 is established. A method of establishing association between the transmitting terminal 200 and the receiving terminal 300 is described with reference to FIG. 4, and thus a more detailed and repeated description will be omitted here for brevity.

Figure 15:
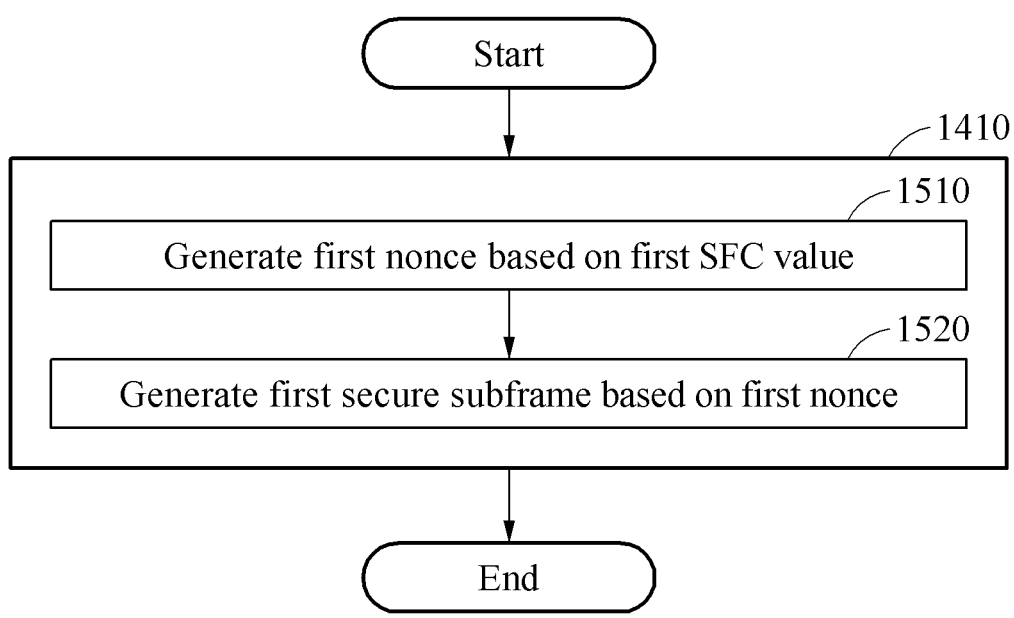
FIG. 15 is a flowchart illustrating a method of generating a first secure subframe according to an example embodiment.

FIG. 15 is a flowchart illustrating a method of generating a first secure subframe according to an example embodiment.

Operation 1410 described with reference to FIG. 14 may include operations 1510 and 1520 to be described hereinafter with reference to FIG. 15.

Referring to FIG. 15, in operation 1510, the processor 220 of the transmitting terminal 200 generates a first nonce based on the first SFC value. The first nonce may be configured based on a unique ID and the first SFC value. The unique ID may include a device address of the transmitting terminal 200. In a case that a field including the unique ID is 6 octets and a field including the first SFC value is 6 octets, the first nonce may be configured to be 12 octets. In a case that the receiving terminal 300 receives the first secure subframe, the receiving terminal 300 may obtain an SFC value of a corresponding frame from an SFC field included in the secure header of the received aggregated frame. The receiving terminal 300 may generate the first nonce by combining the obtained SFC value with the unique ID or the device address of the transmitting terminal 200. The receiving terminal 300 may identify a key used when the aggregated frame is encrypted from an SECID field included in the secure header of the aggregated frame. The receiving terminal 300 may decrypt a first secure payload based on the identified key and the first nonce.

In operation 1520, the processor 220 generates the first secure subframe based on the generated first nonce. The processor 220 may generate the first secure payload by encrypting data using the first nonce. The processor 220 may generate first integrity verification information based on the first nonce. For example, the processor 220 may encrypt a payload using a GCM operation, and generate the first integrity verification information of the first secure subframe. The processor 220 may generate the first secure subframe to include the first secure payload and the first integrity verification information. The processor 220 may encrypt the payload using the GCM operation.

The secure header may include the SECID field and the SFC field. The secure header may be the secure header 825 described with reference to FIG. 8. When the integrity of the first secure subframe is verified, the integrity of the secure header may also be verified simultaneously. Based on an example embodiment, a field of a MAC header may be included as an input to generate the first integrity verification information. In a case that the field of the MAC header is included in the input, integrity of the MAC header may also be simultaneously verified when the integrity of the first secure subframe is verified.

Figure 16:
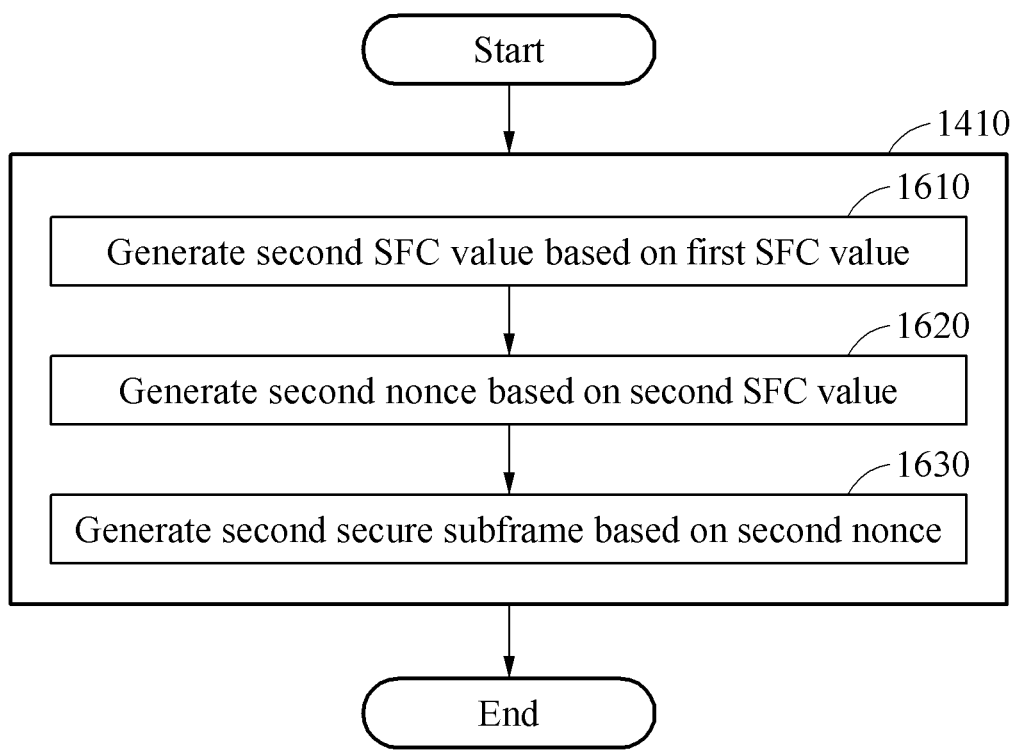
FIG. 16 is a flowchart illustrating a method of generating a second secure subframe according to an example embodiment.

FIG. 16 is a flowchart illustrating a method of generating a second secure subframe according to an example embodiment.

Operation 1410 described with reference to FIG. 14 may include operations 1610, 1620, and 1630 to be described hereinafter with reference to FIG. 16. For example, operations 1610, 1620, and 1630 may be performed after operations 1510 and 1520 described with reference to FIG. 15 are performed. For another example, operations 1610, 1620, and 1630 may be performed in parallel with operations 1510 and 1520.

Referring to FIG. 16, in operation 1610, the processor 320 of the receiving terminal 300 generates a second SFC value based on the first SFC value. A method of generating the second SFC value based on the first SFC value may be predetermined between the transmitting terminal 200 and the receiving terminal 300. For example, generating a value obtained by adding 1 to the first SFC value to be the second SFC value may be preset.

In operation 1620, the processor 220 of the transmitting terminal 200 generates a second nonce of the second subframe based on the generated second SFC value. The second nonce may be configured based on a unique ID and the second SFC value. The unique ID may include a device address of the transmitting terminal 200. In a case that the receiving terminal 300 receives the second secure subframe, the receiving terminal 300 may generate the second nonce based on information included in the secure header of the received aggregated frame, and decrypt a second secure payload in the second secure subframe based on the generated second nonce.

In operation 1630, the processor 220 generates the second secure subframe based on the generated second nonce. The processor 220 may generate the second secure payload by encrypting data using the second nonce. The processor 220 may generate second integrity verification information based on the second nonce. For example, the processor 220 may generate the second integrity verification information using a GCM operation. The processor 220 may generate the second secure subframe to include the second secure payload and the second integrity verification information, and not to include the second SFC value in the aggregated frame.

Figure 17:
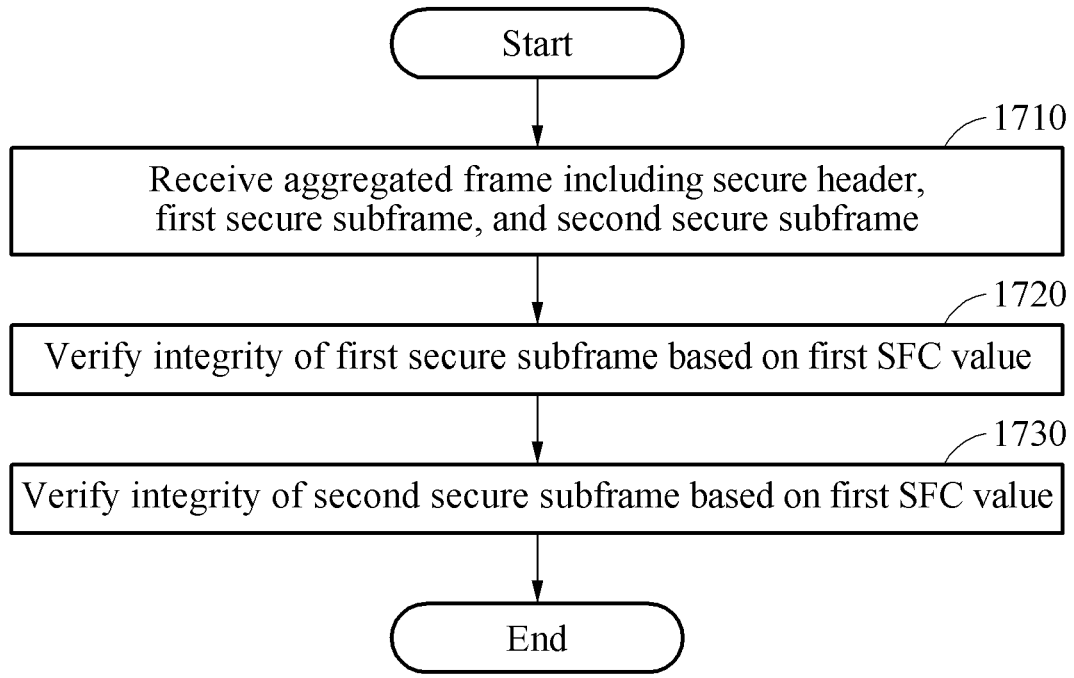
FIG. 17 is a flowchart illustrating a method of verifying integrity of an aggregated frame according to another example embodiment.

FIG. 17 is a flowchart illustrating a method of verifying integrity of an aggregated frame according to another example embodiment.

Operations 1710, 1720, and 1730 to be described hereinafter with reference to FIG. 17 may be performed by the receiving terminal 300 forming a pairnet along with the transmitting terminal 200.

Referring to FIG. 17, in operation 1710, the communicator 310 of the receiving terminal 300 receives an aggregated frame including a first secure subframe and a second secure subframe. Based on an example embodiment, the aggregated frame may further include a secure header including an SECID field and an SFC field. A first SFC value may be included in the SFC field of the secure header. The secure header may be located between a MAC header and a first subframe.

In operation 1720, the processor 320 of the receiving terminal 300 verifies integrity of the first secure subframe based on the first SFC value. In concurrence with the verifying of the integrity, the processor 320 may decrypt an encrypted payload in the first secure subframe based on the first SFC value. A method of verifying the integrity of the first secure subframe will be described in detail with reference to FIG. 18.

In operation 1730, the processor 320 verifies integrity of the second secure subframe based on the first SFC value. A method of verifying the integrity of the second secure subframe will be described in detail with reference to FIG. 19.

Figure 18:
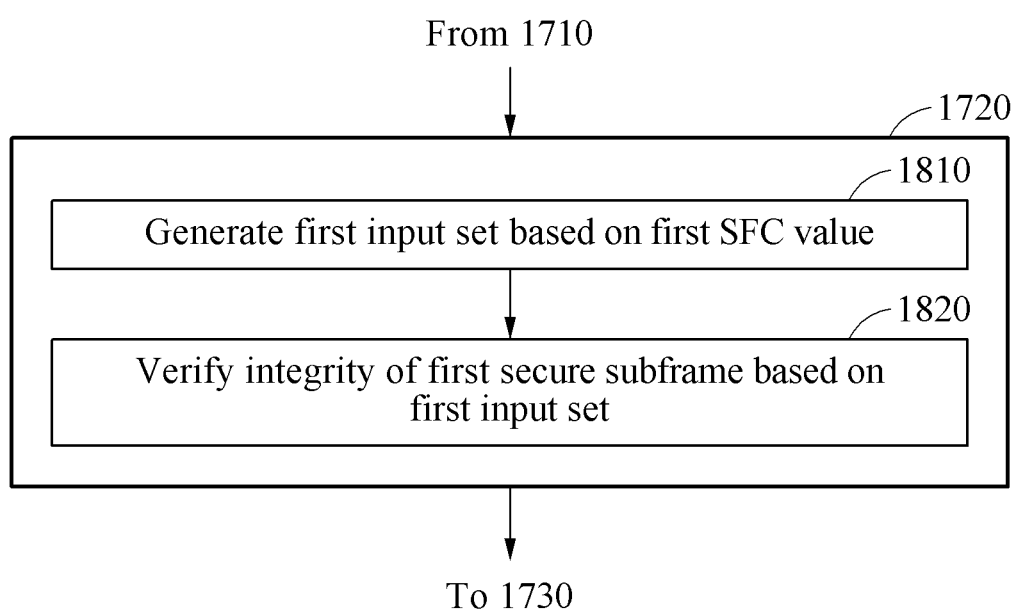
FIG. 18 is a flowchart illustrating a method of verifying integrity of a first secure subframe according to an example embodiment.

FIG. 18 is a flowchart illustrating a method of verifying integrity of a first secure subframe according to an example embodiment.

Operation 1720 described with reference to FIG. 17 may include operations 1810 and 1820 to be described hereinafter with reference to FIG. 18.

Referring to FIG. 18, in operation 1810, the processor 320 of the receiving terminal 300 generates a first input set to verify the integrity of the received first secure subframe based on the first SFC value. The first input set may be used to decrypt the first secure subframe. For example, the first input set may include a frame header, an SECID field, an SFC field, a first subheader, a first secure payload, and an integrity code field. The first SFC value may be a unique SFC value explicitly included in the received aggregated frame. The first SFC value may be a unique value of the first secure subframe in a current key.

In operation 1820, the processor 320 verifies first integrity verification information included in the integrity code field based on the generated first input set. For example, the processor 320 may verify the first integrity verification information using a symmetric GCM operation corresponding to the GCM operation described with reference to FIG. 15. In concurrence with the verifying of the integrity, the processor 320 may decrypt an encrypted payload in the first secure subframe based on the first SFC value. When the verifying of the first integrity verification information based on the first input set is successful, the integrity of the first secure subframe may be determined.

Figure 19:
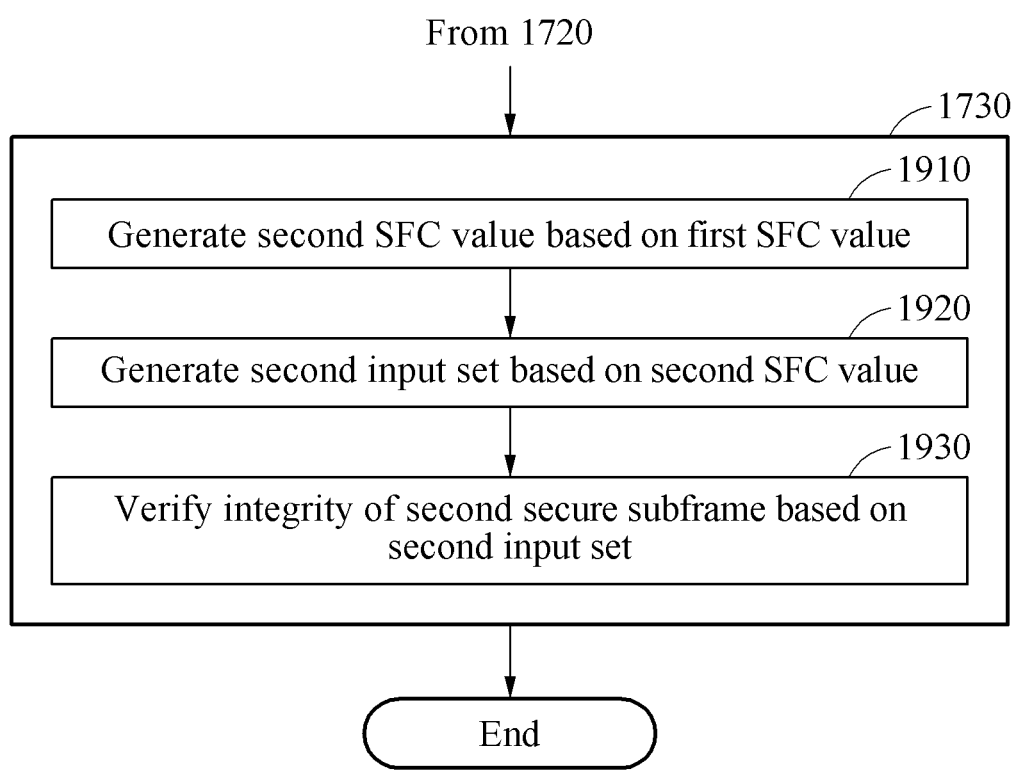
FIG. 19 is a flowchart illustrating a method of verifying integrity of a second secure subframe according to an example embodiment.

FIG. 19 is a flowchart illustrating a method of verifying integrity of a second secure subframe according to an example embodiment.

Operation 1730 described with reference to FIG. 17 may include operations 1910, 1920, and 1930 to be described hereinafter with reference to FIG. 19.

Referring to FIG. 19, in operation 1910, the processor 320 of the receiving terminal 300 generates a second SFC value based on the first SFC value. The second SFC value may be a unique value of the second secure subframe in a current key. For example, the processor 320 may generate the second SFC value by adding a preset value, for example, 1, to the first SFC value. A method of generating the second SFC value based on the first SFC value may be predetermined between the transmitting terminal 200 and the receiving terminal 300. For example, generating, as the second SFC value, a value obtained by adding 1 to the first SFC value may be predetermined.

In operation 1920, the processor 320 generates a second input set to verify the integrity of the second secure subframe based on the second SFC value. For example, the second input set may include at least one of a second subheader, the second SFC value, a second secure payload, or second integrity verification information.

In operation 1930, the processor 320 verifies the second integrity verification information based on the generated second input set. For example, the processor 320 may verify the second integrity verification information using a symmetric GCM operation corresponding to the GCM operation described above with reference to FIG. 9. When the verifying of the second integrity verification information based on data of the second input set is successful, the integrity of the second secure subframe may be determined.

The processor 320 may generate a second nonce based on the second SFC value. The second nonce to be generated by the processor 320 may the same as the second nonce to be generated by the processor 220 of the transmitting terminal 200 described above with reference to FIG. 16. The second nonce may include a unique ID and the second SFC value.

The processor 320 may decrypt the second secure payload based on the generated second nonce. For example, the processor 320 may decrypt the second secure payload based on an encryption key and the second nonce. The encryption key to be used may be identified by an SECID included in the secure header of the received aggregated frame.

In the GCM operation, verifying integrity and decryption may be performed simultaneously. For example, in concurrence with the verifying of the integrity, the processor 320 may decrypt an encrypted payload in the second secure subframe based on the second SFC value. When the integrity of the second secure subframe is determined, the decrypted second secure payload in the second subframe may be used by the receiving terminal 300.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A data transmission method to be performed by a transmitting terminal, the method comprising:
generating a frame header of a plurality of subframes, having a first subframe and a second subframe, to include a first secure frame counter (SFC) value of the first subframe that is used to ensure a uniqueness of a first nonce for the first subframe, wherein the first SFC value is used to generate the first nonce for generating first integrity verification information of the first subframe and used to generate a second SFC value of the second subframe;
generating the first subframe to include the first integrity verification information;
generating the second subframe to include second integrity verification information, wherein the second SFC value is used to generate a second nonce for generating the second integrity verification information;
generating an aggregated frame comprising the frame header, the first subframe, and the second subframe, wherein the first SFC value is a unique SFC value explicitly included in the aggregated frame; and
transmitting the generated aggregated frame to a receiving terminal,
wherein, in response to the first integrity verification information being verified by the receiving terminal, the integrity of the frame header and the integrity of the first subframe are determined, and the first SFC value in the frame header is used to verify the first integrity verification information, and
wherein, in response to the second integrity verification information being verified by the receiving terminal, only the integrity of the second subframe is determined.

2. The method of claim 1, further comprising:
establishing association with the receiving terminal, wherein the aggregated frame is transmitted based on the association.

3. The method of claim 2, wherein the establishing of the association comprises:
generating a beacon frame;
propagating the generated beacon frame;
receiving a response to the beacon frame from the receiving terminal; and
establishing the association with the receiving terminal based on the received response,
wherein, in response to the association with the receiving terminal being established, a beacon frame is not generated.

4. The method of claim 1, wherein the first integrity verification information is generated based on the frame header and a first subheader of the first subframe.

5. The method of claim 1, wherein a second SFC value which is not explicitly included in the received aggregated frame is generated, whose value is the same as the second SFC value used by the transmitting terminal for generating the second integrity verification information, using the first SFC value in the frame header of the received aggregated frame by the receiving terminal.

6. The method of claim 5, wherein the second SFC value generated by the receiving terminal is used to verify the second integrity verification information.

7. The method of claim 1,
wherein the generating of the second subframe comprises:
generating the second SFC value of the second subframe based on the first SFC value;
generating second integrity verification information of the second subframe based on the generated second SFC value; and
generating the second subframe to include the second integrity verification information and not to include the second SFC value.

8. The method of claim 7, wherein a method of generating the second SFC value based on the first SFC value is predetermined between the transmitting terminal and the receiving terminal.

9. A transmitting terminal configured to transmit data, the transmitting terminal comprising:
a processor configured to:
generate a frame header of a plurality of subframes, having a first subframe and a second subframe, to include a first secure frame counter (SF C) value of the first subframe that is used to ensure a uniqueness of a first nonce for the first subframe, wherein the first SFC value is used to generate the first nonce for generating first integrity verification information of the first subframe and used to generate a second SFC value of the second subframe;
generate the first subframe to include the first integrity verification information;
generate the second subframe to include second integrity verification information, wherein the second SFC value is used to generate second nonce for generating the second integrity verification information;
generate an aggregated frame comprising the frame header, the first subframe, and the second subframe, wherein the first SFC value is a unique SFC value explicitly included in the aggregated frame; and
a communicator configured to transmit the generated aggregated frame to a receiving terminal, wherein, in response to the first integrity verification information being verified by the receiving terminal, the integrity of the frame header and the integrity of the first subframe are determined, and the first SFC value in the frame header is used to verify the first integrity verification information, and wherein, in response to the second integrity verification information being verified by the receiving terminal, only the integrity of the second subframe is determined.

10. The method of claim 1, wherein the generating the first subframe comprises:

generating a first nonce based on the first SFC value; and generating the first secure subframe based on the generated first nonce.

11. The method of claim 1, wherein the generating the second subframe comprises:

generating a second nonce based on the generated second SFC value; and generating the second secure subframe based on the generated second nonce.

* * * * *